Oct. 4, 1927.

B. GOLEMBIEWSKI 1,644,334

THEFT PREVENTING DEVICE FOR AUTOMOBILES

Filed July 13, 1925

INVENTOR
Boleslaw Golembiewski
BY
ATTORNEY

Patented Oct. 4, 1927.

1,644,334

UNITED STATES PATENT OFFICE.

BOLESLAW GOLEMBIEWSKI, OF UTICA, NEW YORK.

THEFT-PREVENTING DEVICE FOR AUTOMOBILES.

Application filed July 13, 1925. Serial No. 43,074.

This invention relates to improvements in theft preventing devices, particularly devices for preventing the theft of automobiles or the like, and it is the principal object of the invention to provide means for preventing the wheels of a car from rotating if the car is started by an unauthorized person.

Another object of the invention is the provision of a chain and lock adapted to connect the front and rear wheels or two front and two rear wheels of a car between the spokes thereof.

A further object of the invention is the provision of an automobile theft preventing device of simple and inexpensive construction yet durable and readily attached to or detached from a car.

A still further object of the invention is the provision of a chain and lock for theft preventing devices, which have means cooperating therewith for readily storing the chain when not in use allowing a quick dispensing of the same when it is to be used.

These and other objects and advantages of the invention will become more fully known as the description thereof proceeds and will then be more specifically defined in the appended claims.

In the accompanying drawing forming a material part of this disclosure:

Figure 1:
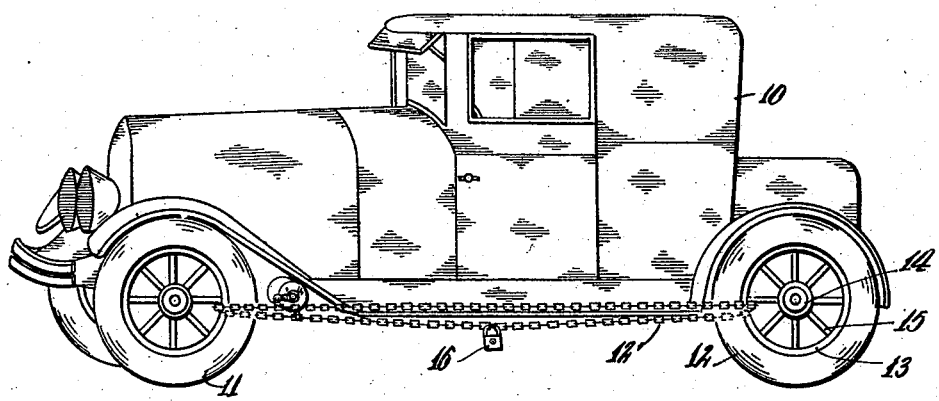
Fig. 1 is a side elevation of an automobile equipped with a theft preventing chain according to the present invention.
Figure 2:
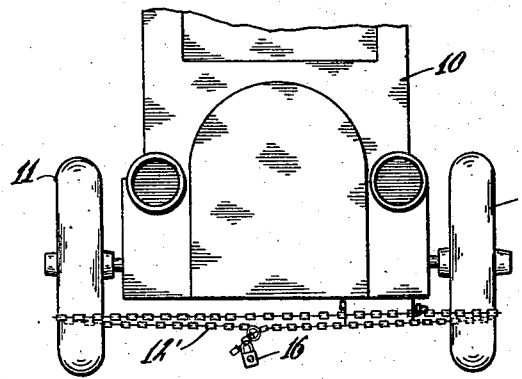
Fig. 2 is a fragmentary front elevation thereof.
Figure 4:
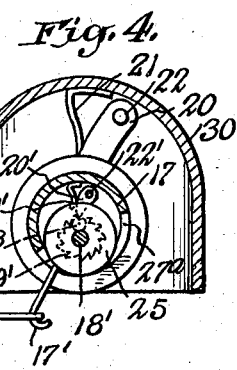
Fig. 4 is an enlarged vertical sectional view taken on the line 4—4 of Fig. 3.
Figure 3:
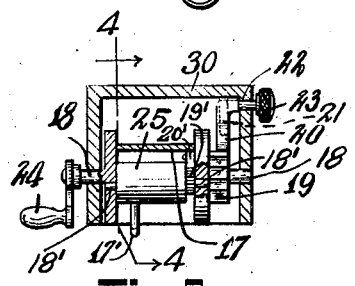
Fig. 3 is a central vertical sectional view of the chain storing and dispensing means certain parts not being shown in section.

A car 10 of any conventional type or make having front and rear wheels 11 and 12, has a chain 12′ guided between the felly 13 and hub 14 of each wheel between two spokes 15 thereof, having its ends connected by means of a padlock 16 or the like, of any well known suitable make.

A drum 17 to which one end of the chain 12′ is secured, as at 17′, which is adapted to be wound thereupon, is rotatable on a transverse shaft 18 supported in a suitable manner in the car frame being housed in casing 30, and has attached thereto at one end, a ratchet wheel 19 adapted to be engaged by a pawl 20 pivotally secured on the end wall of the casing 30 and normally pressed into engagement with the teeth of the ratchet wheel by means of a spring 21.

The pivot pin 22 of the pawl is extended beyond the end wall of the casing 30 and carries a handle 23 or knob by means of which the pawl can be operated to engage or be disengaged from the ratchet. The opposite end of shaft 18 projects from the casing 30 and carries a crank arm 24 or the like.

A drum 25 rotatably mounted on a shaft 18′ is located in the drum 17 and has a finger 26 attached thereto projecting through an opening 27 of the outer drum 17, to which a link 28 of the chain is attached intermediate the ends thereof. The drum 25 has a ratchet wheel 19′ fixed to one side, said ratchet wheel being engaged by a pawl 20′, pivotally mounted on the drum wall, as at 22′, normally held in engagement by the action of a spring 21′ fastened at one end to the inside of the drum 17, and having its other end bearing against the said pawl. A tool may be inserted through the opening 27, as for instance at the point 27ª, to raise the spring 21′, and thereafter the pawl 20′. The angular position of the drum 25 may then be adjusted to obtain any desired angular projection of the finger 26 so as to better accommodate the links of the chain 28, irrespective of the angle of approach. Withdrawing the inserted tool will result in the pawl engaging the ratchet wheel and thus locking the finger 26 in its adjusted position.

While I have shown and described the preferred form of my device, it will be clear that such changes may be made therein, as fall within the scope of the appended claims without departure from the spirit of the invention.

Having thus described my invention, what I claim as new, and desire to secure by Letters Patent, is:

1. In a device of the class described, a casing, a hollow drum rotatably supported therein, a handle connected to the drum, a ratchet wheel fastened to one side of the said drum, a pawl pivotally mounted on the casing and engageable with the said ratchet wheel, said hollow drum being formed with an opening in the side, a shaft rotatable within the hollow drum, an inner drum fixed on the shaft, a finger projecting from the inner drum emerging from the opening in the first mentioned drum, a ratchet wheel fastened to the side of the inner drum, a pawl pivotally mounted in the first mentioned drum, and engageable with the last mentioned ratchet wheel, and means for normally urging the said pawls into engagement with the ratchet wheels.

2. In a device of the class described, a casing, a hollow drum rotatably supported therein, a handle connected to the drum, a ratchet wheel fastened to one side of the said drum, a pawl pivotally mounted on the casing and engageable with the said ratchet wheel, means for manually moving the pawl, said hollow drum being formed with an opening in the side, a shaft rotatable within the hollow drum, an inner drum fixed on the shaft, a finger projecting from the inner drum emerging from the opening in the first mentioned drum, a ratchet wheel fastened to the side of the inner drum, a pawl pivotally mounted in the first mentioned drum, and engageable with the last mentioned ratchet wheel, and means for normally urging the said pawls into engagement with the ratchet wheels, said latter means comprising a spring supported at one end, the other end engaging against the pawls.

In testimony whereof I have affixed my signature.

BOLESLAW GOLEMBIEWSKI.